(12) United States Patent
Maeda (10) Patent No.: US 6,731,254 B2
(45) Date of Patent: May 4, 2004

(54) IMAGE DISPLAY DEVICE (75) Inventor: Yoshihiro Maeda, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 58 days.

(21) Appl. No.: 09/840,221

(22) Filed: Apr. 23, 2001

(65) Prior Publication Data

US 2001/0050660 A1 Dec. 13, 2001

(30) Foreign Application Priority Data

Apr. 24, 2000 (JP) ........................................ 2000-122095

(51) Int. Cl.$^7$ ................................................ G09G 5/00
(52) U.S. Cl. ........................................ 345/8; 359/630
(58) Field of Search ...................... 345/7, 8, 9; 348/51, 348/52, 53, 54; 349/11, 15, 13; 359/629, 630, 631, 632, 633, 831, 832, 833, 834; 351/158

(56) References Cited

U.S. PATENT DOCUMENTS

| | | | | |
|---|---|---|---|---|
| 4,636,866 A | * | 1/1987 | Hattori | 345/8 |
| 5,276,471 A | * | 1/1994 | Yamauchi et al. | 345/8 |
| 5,281,957 A | * | 1/1994 | Schoolman | 345/8 |
| 5,642,221 A | * | 6/1997 | Fischer et al. | 345/8 |
| 5,682,173 A | * | 10/1997 | Holakovszky et al. | 345/8 |
| 5,712,649 A | * | 1/1998 | Tosaki | 345/8 |
| 6,137,602 A | * | 10/2000 | Mukawa | 345/8 |
| 6,215,460 B1 | * | 4/2001 | Mizoguchi et al. | 345/8 |
| 6,335,711 B1 | * | 1/2002 | Maeda et al. | 345/8 |
| 6,452,572 B1 | * | 9/2002 | Fan et al. | 345/8 |
| 6,480,174 B1 | * | 11/2002 | Kaufmann et al. | 345/8 |

FOREIGN PATENT DOCUMENTS

| | | |
|---|---|---|
| JP | 06-110013 A | 4/1994 |
| JP | 06-110014 A | 4/1994 |

* cited by examiner

Primary Examiner—Xiao Wu
(74) Attorney, Agent, or Firm—Frishauf, Holtz, Goodman & Chick, P.C.

(57) ABSTRACT

An image display device is disclosed. The image display device comprises right and left image display means arranged to direct display plane to right and left outsides substantially respectively in the vicinity of central portion of user's both eyes in operation mode observing image, and right and left optical elements for leading to user's right and left eyeballs by reflecting each luminous flux concerning to right and left images from these right and left image display means in a horizontal plane respectively.

7 Claims, 10 Drawing Sheets

IMAGE DISPLAY DEVICE

BACKGROUND OF THE INVENTION

1. Field of the Invention

The present invention relates to an image display device, particularly, an image display device for mounting it on the face portion, such as a spectacle, to observe the displayed image.

2. Related Art Statement

The image display device with CRT has been widely used in the past, but recently the image display device using a liquid crystal display element etc., is gradually gaining market share.

Even in such an image display device, the image display device mounted to user's face such as glasses differs from other portable image display devices, and can observe the image hands free, and the observation view is the same as the case by which the large screen is observed, is obtained, so that it has merit that the observation of the image with the presence and power becomes possible.

As for such an image display device, various devices were proposed in the past, for example, a liquid crystal display element (LCD) of transmission type which is horizontally arranged in an operation mode of mounting the liquid crystal display element on the head or the face, the image displayed by the LCD is illuminated from an upper side by the back light of a flat plane fluorescence type, which builds in the fluorescent tube, and the illuminated image is lead to the eyeball by reflecting the image twice in the vertical plane which contains a user's visual axis with an optical element such as prisms, and such devices are made as a product.

Moreover, Japanese Patent Application Laid-open No. 6-110013 proposed that LCD is arranged vertically so as to display the image in an operation mode which mounts it on the head in central portions of user's both eyes toward at the face, the image displayed in the LCD is reflected right and left by V type mirror, and after reflecting the luminous flux concerning with these images reflected right and left, is reflected with the mirror, respectively, and the luminous flux will lead to right and left eyeballs through the ocular.

In addition, Japanese Patent Application Laid-open No. 6-110014 proposed that LCD is arranged vertically so as to display the image in the operation mode which mounts to the head in central portions of user's both eyes aiming at forward, the display image of the LCD is reflected right and left with the prism, and after reflecting the luminous flux concerned with these images reflected right and left with the mirror, respectively, the luminous flux will lead to right and left eyeballs through the ocular.

However, in the constitution that LCD is horizontally arranged as described above, and the display image is reflected twice in vertical plane which contains the visual axis with an optical element, it is worries that the size in the vertical direction of an optical element becomes long, and the main body of the apparatus becomes large as the goggle.

On the contrary, in the video imaging system disclosed in Japanese Patent Application Laid-open No. 6-110013 and Japanese Patent Application Laid-open No. 6-110014, LCD is arranged vertically, and its display image is made reflected in a horizontal plane and led to the eyeball, so that there is an advantage that the height of the main body can be reduced, and the device can be made thin.

However, the device disclosed in Japanese Patent Application Laid-open No. 6-110013 requires V type mirror, a mirror and the eyepiece, or, the device disclosed in Japanese Patent Application Laid-open No. 6-110014 requires a prism, a mirror, and an eyepiece, so that there is a problem of a number of high parts count, complicated constitution, and assembly becoming annoying, and becoming a cost rising.

SUMMARY OF THE INVENTION

The present invention has for its object to cancel the above defect considering the conventional problem particular. The present invention has for its another object to make a main body of the device thin, and to provide an image display device which can be manufactured easily and cheaply.

[Solution for the Task]

To this end, first aspect of the present invention is an image display device comprising right and left image display means arranged to direct display plane to right and left outsides substantially respectively in the vicinity of central portion of user's both eyes in operation mode observing image, and right and left optical elements for leading to user's right and left eyeballs by reflecting each luminous flux concerning to right and left images from these right and left image display means in a horizontal plane respectively.

In a preferred embodiment of the present invention, the above right and left image displaying means are constituted respectively by the image displaying means of the light receiving type, and have illumination means for illuminating them by an illumination light.

The above illumination means has a light emitting element and a light leading member for leading light from the light emitting element to the right and left image displaying means, and the light emitting element is arranged on an upper side of the light leading member.

Moreover, in a suitable embodiment of the present invention, the right and left image displaying means, light leading members, and right and left optical elements are held on a supporting member, a circuit board is arranged on the upper surface side of the supporting member, and the circuit board is provided with the light emitting element and the driving circuit thereof, and with a driving circuit of the right and left image displaying means.

The supporting member have a lid member on the upper surface side, and the lid member is provided with an opening opposite to the light emitting element, so that light from the above light emitting element is made incident on to the light leading member through the opening.

The above supporting member have a transparent member to the upper surface side, and light from the light emitting element is made incident on to the light leading member through the transparent member.

In a suitable embodiment of the present invention, the illumination means is provided independently in corresponded to the right and left image displaying means.

Moreover, the circuit board having at least a part of the driving circuit of the above right and left image displaying means and/or the driving circuit of the right and left illumination means, is arranged between the right and left illumination means.

Also, the right and left image displaying means is constituted respectively by the image displaying means of self-light emission type, the right and left image displaying means and the right and left optical elements are held on the supporting member, the circuit board is displaced on the supporting member, and the circuit board is provided with the driving circuit of the right and left image displaying means.

The invention concerned with the second aspect of present invention is an image displaying device comprising an image displaying means arranged in central portions of user's both eyes in operation mode observing image, a light splitting element for splitting and emanating each luminous flux concerning with right and left images by reflecting luminous flux concerning with images from the image display means in a horizontal plane, right and left optical elements for leading each luminous flux concerning with right and left images separated by the light splitting element to user's right and left eyeballs, and the image displaying means has a substantially symmetric field angle characteristic.

In a suitable embodiment of the present invention, the field stop for limiting view is provided between the above light splitting element and right and left optical elements, respectively.

Also, the above right and left optical elements are constituted by a prism, respectively, the positioning engage portion for the supporting member is installed on a part of at least one ridge line portion of these prisms and a part of the side where the luminous flux does not act on the image.

Moreover, the emergent plane of the right and left optical elements is arranged by inclining it so that the emergent plane to the corresponding eyeball may direct in the direction of the center of user's face.

The invention concerned with third aspect of the present invention is an image display device comprising right and left image displaying means arranged outside of user's both eyes in operation mode observing image, and right and left optical elements for leading luminous flux concerned with right and left images from these right and left image display means to user's right and left eyeballs by reflecting luminous flux in a substantial horizontal plane, respectively, thereby being able to observe external world through these right and left optical elements.

In a suitable embodiment of the present invention, the right and left optical elements are fitted to a see-through optical element.

Moreover, in a suitable embodiment of the present invention, a hologram optical element is used for either of the optical element or the light leading members for illumination.

In addition, the right and left optical elements are fitted to the casing to which the right and left observation window corresponding to user's right and left eyeballs are installed.

Also, the main body of the image display device is constituted detachably to the headphone frame of the headphone frame.

Moreover, a video signal and a driving power are received from the headphone.

In a suitable embodiment of the present invention, the main body of the above image display device is located in the upper part of the headphone frame in the using state observing the image.

Moreover, the main body of the above image display device is located in the upper part of the headphone frame in the using state observing the image.

In a suitable embodiment of the present invention, the main body of the above image display device is made a rotatable for the headphone frame.

Also, the main body of the above image display device is made a rotatable for the headphone frame.

DETAILED EXPLANATION OF THE PREFERRED EMBODIMENT

Now to the drawings, there are shown various embodiments of an image display device according to the present invention. Like parts are shown by corresponding reference characters throughout several views of the drawings.

The embodiment of the image display device according to the present invention is explained referring to FIG. 1–FIG. 11 as follows.

Figure 1:
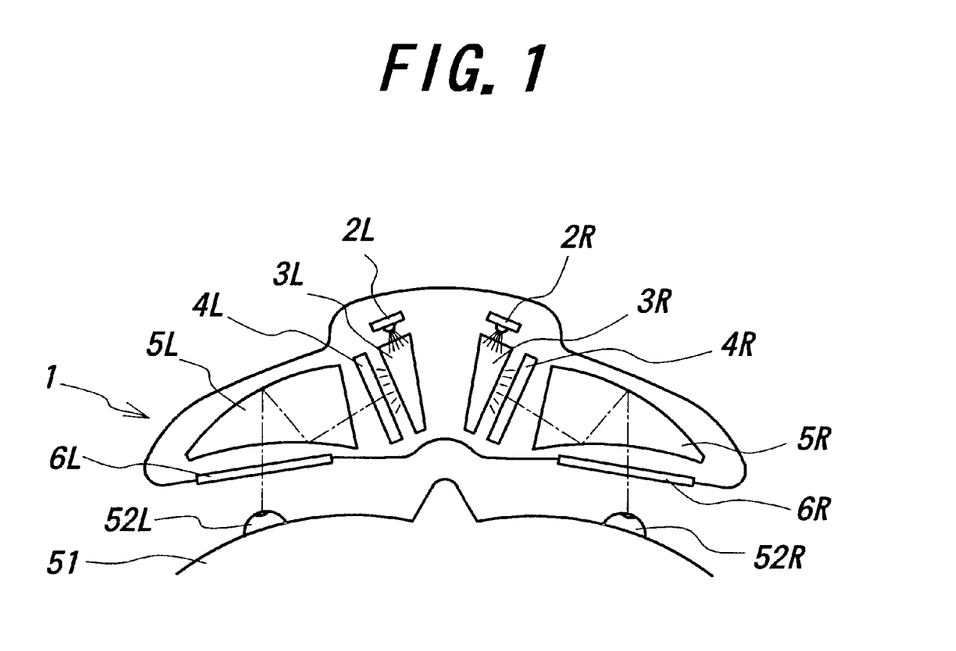
FIG. 1 is a plan view showing a constitution of first embodiment of an image display device according to the present invention, diagrammatically.

FIG. 1 is a plan view showing the constitution of the first embodiment of the present invention diagrammatically. The image display device 1 (hereafter, referred to as a main body 1 of the device) has right and left LEDs 2L, 2R, right and left light leading members 3L, 3R, right and left LCDs 4L, 4R of transmission type right and left, optical element 5L, 5R, and, right and left observation windows 6L, 6R, which are arranged symmetrically corresponding to right and left eyeballs 52L, 52R of the user 51.

LCDs 4L, 4R are arranged in such a manner that the display plane is directed almost vertically in the vicinity of both eye central portion of the user 51, respectively in the operation mode which mounts them to the face aiming at outside of right and left, the light leading members 3L, 3R are arranged on those back sides, and LEDs 2L, 2R are arranged on a front side in main body 1 of the device.

Here, LED 2L and light leading member 3L as well as LED 2R and light leading member 3R constitute right and left illumination means, respectively, and LEDs 2L, 2R are constituted by plural LEDs emitting light with comparatively short wavelength (for example, blue light), respectively, light from LEDs 2L, 2R are made incident on the corresponding light leading members 3L, 3R, thereby being fluorescently scattered, so that corresponding LCDs 4L, 4R as uniform white illumination light are illuminated from the back side.

Each of optical elements 5L, 5R uses a so-called free-shaped prism which adopts a sculptured surface where a high optical performance can be secured while miniaturizing and lightweighting them, thereby leading luminous flux concerning the image from corresponding LCDs 4L, 4R to right and left eyeballs 52L, 52R through observation windows 6L, 6R by reflecting them twice in a horizontal plane.

Thus, LCD 4L is white-illuminated from the back side by the light of LED 2L through the light leading member 3L, thereby leading luminous flux concerning with the image displayed in LCD 4L to left eyeball 52L through observation window 6L by reflecting them twice with the optical element 5L in a horizontal plane. Similarly, LCD 4R is white-illuminated from the back side by the light of LED 2R through the light leading member 3R, thereby leading luminous flux concerning with the image displayed in LCD 4R to the right eyeball 52R through the observation window 6R by reflecting them twice with the optical element 5R in a horizontal plane.

According to this embodiment, each of optical elements 5L, 5R reflects luminous flux concerning with the image from corresponding LCDs 4L, 4R twice in a horizontal plane, respectively, so that the parts count can be reduced, and the device can keep easy and cheap, and thus the main body 1 of the device can be made thin.

Figure 2A:
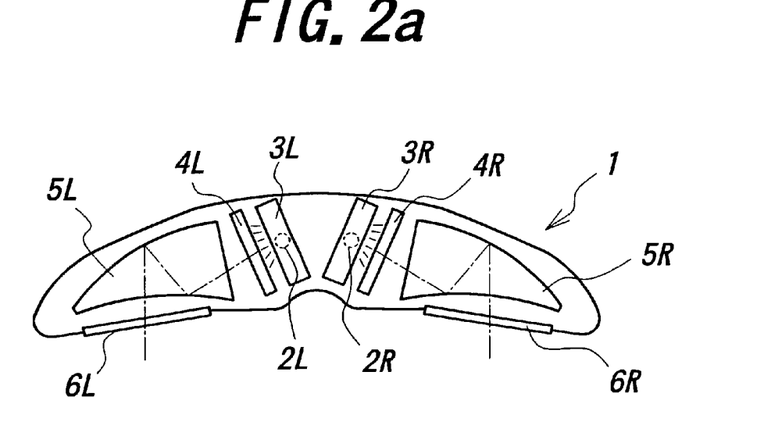
FIGS. 2a and 2b are a plan view and a front elevation showing constitution of second embodiment of the image display device according to the present invention, diagrammatically.
Figure 2B:
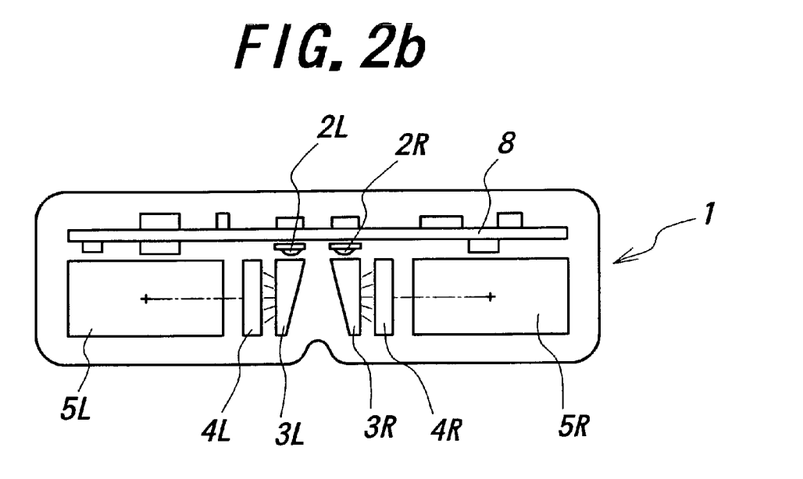

FIG. 2 shows a constitution of second embodiment of the present invention diagrammatically; FIG. 2(a) is a plan view and FIG. 2(b) is a front view. This embodiment is arranged in such a matter that in the constitution shown in FIG. 1, LED 2L, light leading member 3L, LED 2R, and light leading member 3R are rotated by 90 degrees so as to locate LEDs 2L and 2R on an upper side in the main body 1 of the device. LED 2L, 2R have driving circuits thereof and driving circuits of LCD 4L, 4R and are fitted to a circuit board 8 arranged on an upper side in main body 1 of the device.

In this way, compared with the first embodiment, the main body 1 of the device does not extrude forward, so that the weight balancing improves, and an excellent installation can be maintained, as well as a depth size of the main body 1 becomes small, the further downsizing and the weight reduction of the device can be achieved.

Figure 3A:
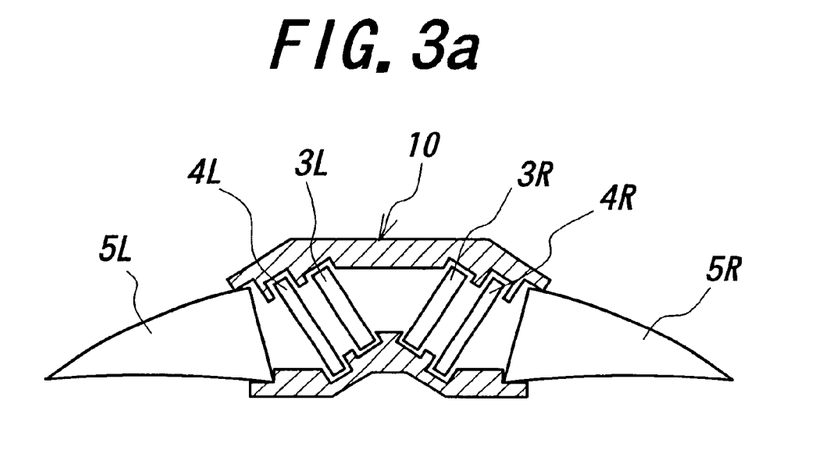
FIGS. 3a and 3b are a cross-sectional view and a partially exploded perspective view showing constitution of third embodiment of the image display device according to the present invention, diagrammatically.
Figure 3B:
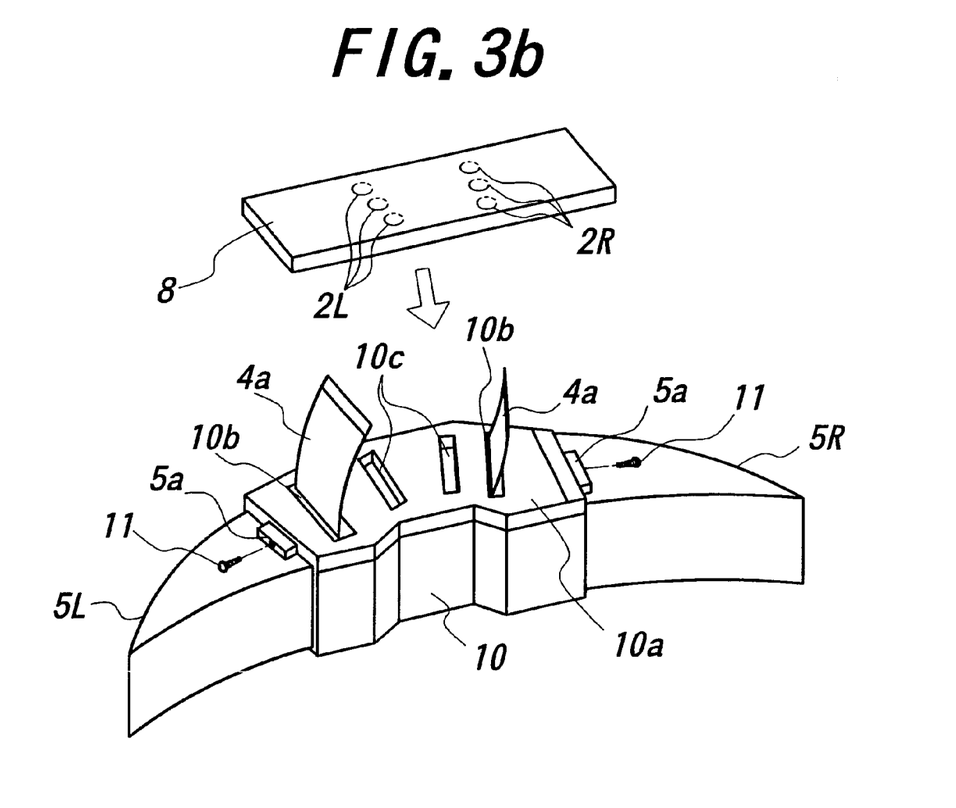

FIG. 3 shows a third embodiment of the present invention; FIG. 3(a) is a cross-sectional view and FIG. 3(b) is a partially exploded perspective view. In the second embodiment of the present embodiment, light leading member 3L, 3R, LCDs 4L, 4R are held by positioning them to a shaded supporting member 10. Moreover, the optical elements 5L, 5R are provided with machine screw fitting projection 5a at the side to which an optical plane is not formed, respectively, and the incident plane side of these optical elements 5L, 5R is inserted in the supporting member 10 and positioned, and these optical elements 5L, 5R are fixed to the supporting member 10 by the machine screw 11 at the portion of the machine screw fitting projection 5a.

The supporting member 10 has an upper surface for holding the light leading members 3L, 3R and LCDs 4L, 4R as an opened structure so as to cover a lid member 10a by the upper surface, the lid member 10a is provided with cable slits 10b, 10b to put out a flat cable 4a of LCDs 4L, 4R, and illumination slits 10c, 10c for making light from LEDs 2L, 2R fitted to the circuit board 8 is make incident on the corresponding light leading members 3L, 3R.

Thus, the circuit board 8 is arranged on an upper side of the lid member 10a so that LEDs 2L, 2R may oppose (*O) to illumination slits 10c, 10c, the flat cable 4a of LCDs 4L, 4R is connected to the LCD driving circuit of the circuit board 8.

According to this embodiment, surroundings on the incident plane side of the light leading members 3L, 3R, LCDs 4L, 4R, and optical elements 5L, 5R are covered with the supporting member 10, so that stray light can be effectively prevented from being entered and thus the image can be observed always excellently.

Moreover, lid member 10a can constitute by a transparent member, and can omit the illumination slits 10c, 10c in this case. Even in this case, it can prevent stray light from being intruded by the circuit board 8 arranged on an upper plane side of the lid member 10a, so that, the image can be observed always excellently.

Figure 4:
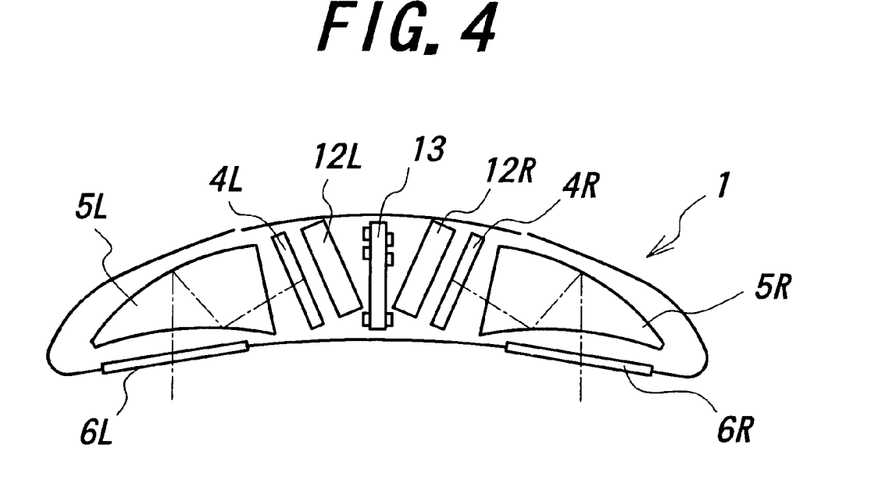
FIG. 4 is a plan view showing a constitution of fourth embodiment of an image display device according to the present invention, diagrammatically.

FIG. 5 is a plan view showing the constitution of fourth embodiment according to the present invention, diagrammatically. The present embodiment is so constructed that in the second embodiment, flat fluorescent tubes 12L, 12R are used as right and left illumination means, the driving circuit of flat fluorescent tube 12L and 12R and/or the circuit board 13 having at least a part of the driving circuit of LCDs 4L, 4R, is arranged substantially vertically between these flat fluorescent tube 12L and 12R, that is, at central portion of both eyes.

In such a way, useless space in the main body 1 of the device can be eliminated by arranging the circuit board 13, and further downsizing becomes possible. Moreover, in this embodiment, the flat fluorescent tube was used as an illumination means, but LED and the light leading member can be used as in first to third embodiments.

Figure 5:
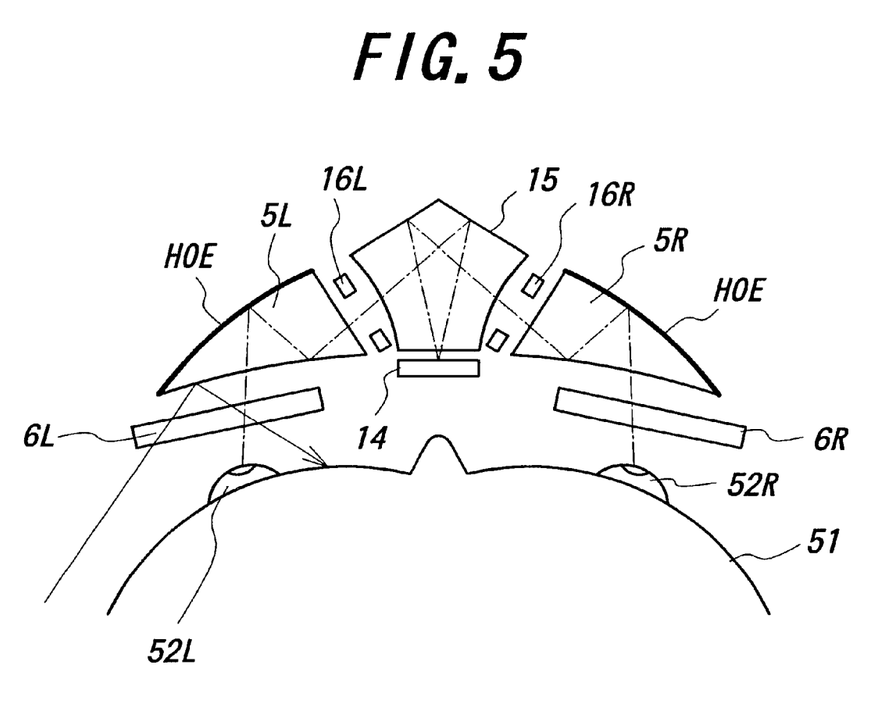
FIG. 5 is a plan view showing the constitution of principal portion of fifth embodiment of the image display device according to the present invention, diagrammatically.

FIG. 5 is a plan view showing the constitution of the principal portion of the fifth embodiment according to the present invention, diagrammatically. In the present embodiment, one image displaying element 14 of self emission type consisting of, for example, an organic EL element, is used as an image displaying means, and its displaying surface is arranged at the center portion of both eyes almost vertically at forward. The luminous flux concerning with an image from the image displaying element 14 is split into sub-luminous flux concerning with the right and left images by reflecting once with a splitting prism 15 in a horizontal plane, and after right and left fields are limited by diaphragms 16L, 16R, the luminous flux concerning with these right and left images is led to the user's 51 right and left eyeballs 52L, 52R through right and left optical elements 5L, 5R, and right and left observation windows 6L, 6R as in the embodiment. Here, optical elements 5L, 5R are arranged to incline them in such a manner that the emergent plane to the corresponding eyeball may direct in the direction of the center of user's face.

According to this embodiment, the image display device 14 of the self emission type is used, so that the illumination means becomes unnecessary, and the constitution can be simplified. Moreover, the optical elements 5L, 5R are arranged to incline them in such a manner that the emergent plane to the corresponding eyeballs may direct in the direction of the center of user's face, so that the outer light incident on the emission plane of the optical elements 5L, 5R can be reflected and directed to the inner side (nose side) rather than corresponding eyeballs. Therefore, it can be possible to prevent the outer light being entered in the eyeball effectively, so that an image can be observed in the always excellent state without being obstructed to the outer light.

Moreover, in the present embodiment, instead of providing diaphragms 16L, 16R, the diaphragm function for limiting the field may be provided by performing the light shielding process such as Indian ink painting to the incident end plane of the optical elements 5L, 5R. Moreover, As described above, the constitution that the image displaying element of self emission type is used, and optical elements 5L, 5R are arranged to incline so that the emanation plane to the corresponding eyeballs may directed in the direction of the center of user's face, can be effectively applied also to first to fourth embodiments. Moreover, oppositely in the present embodiment, LCD of the transmission type is used instead of the image displaying element 14 of self emission type, thereby being illuminated by the illumination means.

Figure 6A:
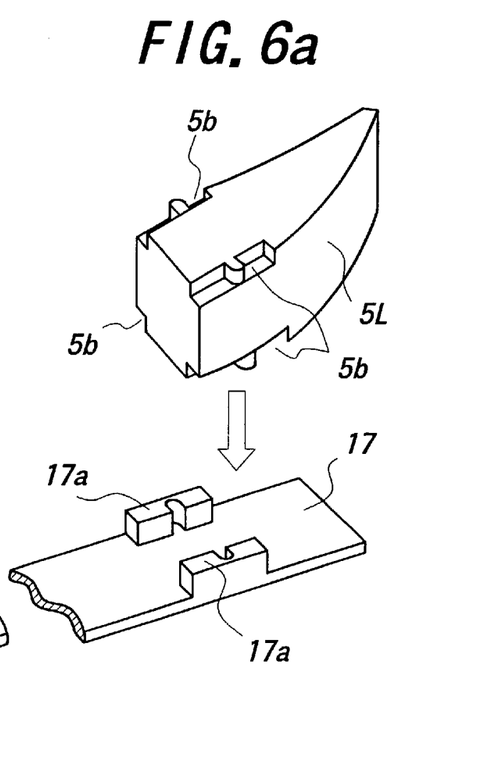
FIGS. 6a, 6b and 6c are perspective views and a cross-sectional view showing constitution of a sixth embodiment of the image display device according to the present invention, diagrammatically.
Figure 6B:
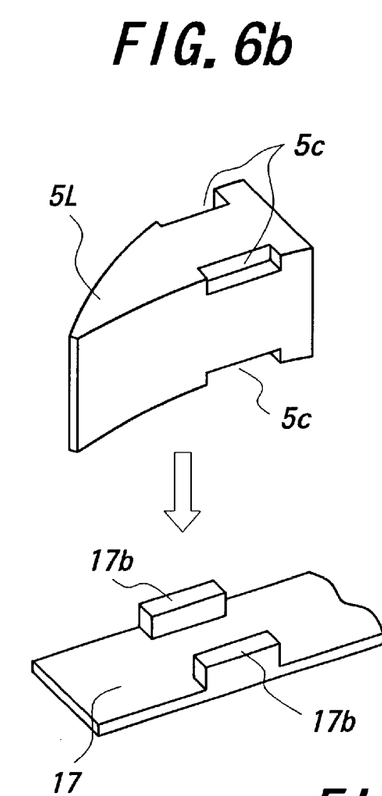
Figure 6C:
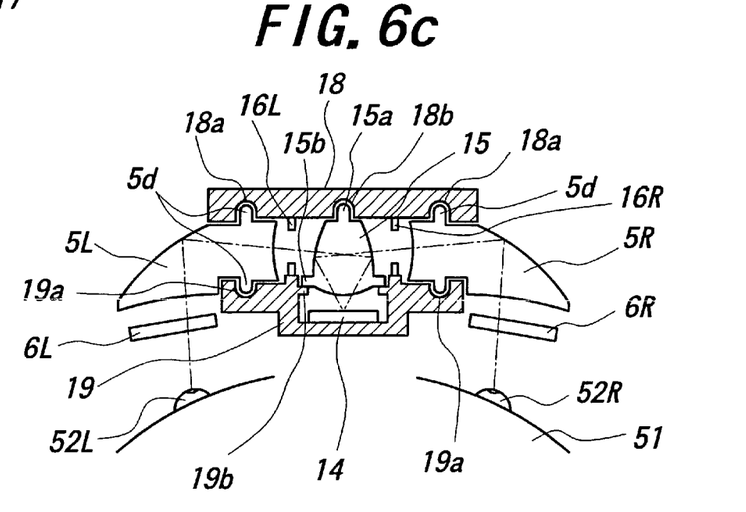

FIGS. 6(a), 6(b) and 6(c) are exploded perspective views to explain the sixth embodiment of the present invention. In this embodiment, the optical elements 5L, 5R are positioned and held by pinching them with two supporting members 17. In FIG. 6(a), a positioning recess and projection engagement portion 5b is provided to a part of the ridge line portions before and after on upper and lower planes of the optical element 5L (5R) respectively, and a positioning recess and projection engagement portion 17a engaged to the corresponding recess and projection engagement portion 5b of the optical element 5L (5R) is provided to upper and lower supporting members 17 pinching the optical element 5L (5R) (lower supporting member shown in FIG. 6(a)).

Moreover, in FIG. 6(b), positioning recess engagement portion 5c is provided to a part of the ridge line portion before and behind the upper and lower planes of the optical element 5L (5R), respectively, and a positioning projection engagement portion 17b engaged to the corresponding recess engagement portion 5b of the optical element 5L (5R) is provided to upper and lower supporting members 17 pinching the optical element 5L (5R) (lower supporting member shown in FIG. 6(b)).

In FIG. 6(c), in the constitution shown in FIG. 5, optical elements 5L, 5R and splitting prism 15 are held and positioned by pinching them with two supporting members 18, 19 from back and belly (front and rear) and held by positioning the image display device 14 to a rear supporting member 19. Therefore, positioning projection engagement portion 5d is formed to the portion of the optical element 5L, 5R on which luminous flux concerned with the image does not act at its before and behind planes, and recess engagement portions 18a, 19a engaged with the projection engagement portion 5d of the optical elements 5L, 5R are formed in two supporting members 18, 19. Moreover, the splitting prism 15 is provided with a projection engagement portion 15a formed on the forward side, and a flange portion 15b formed on the rear side around it, respectively, the supporting member 18 is provided with recess engagement portion 18b engaged with the projection engagement portion 15a, and the supporting member 19 is provided with a receiving portion 19b engaged with the flange portion 15b.

According to such a constitution, in the case shown in of FIGS. 6(a) and 6(b), the optical elements 5L, 5R, can be held to the two supporting members 17 by positioning and pinching two upper and lower supporting member 17 on the optical elements 5L, 5R with excellent precision. In the case shown in FIG. 6(c), the optical elements 5L, 5R, and the splitting prism 15 can be held to the two supporting members 18, 19 back and forth by positioning and pinching them with excellent precision.

Figure 7A:
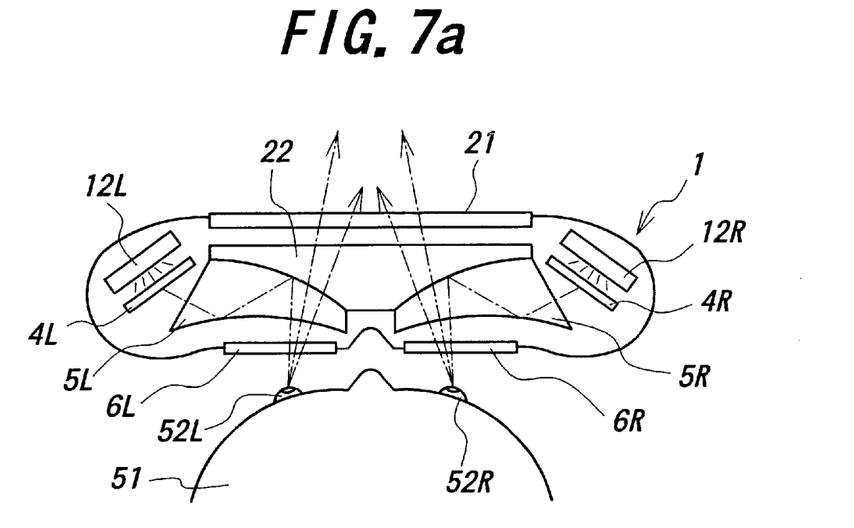
FIGS. 7a and 7b are a plan view and a partially exploded perspective view showing constitution of seventh embodiment of the image display device according to the present invention, diagrammatically.
Figure 7B:
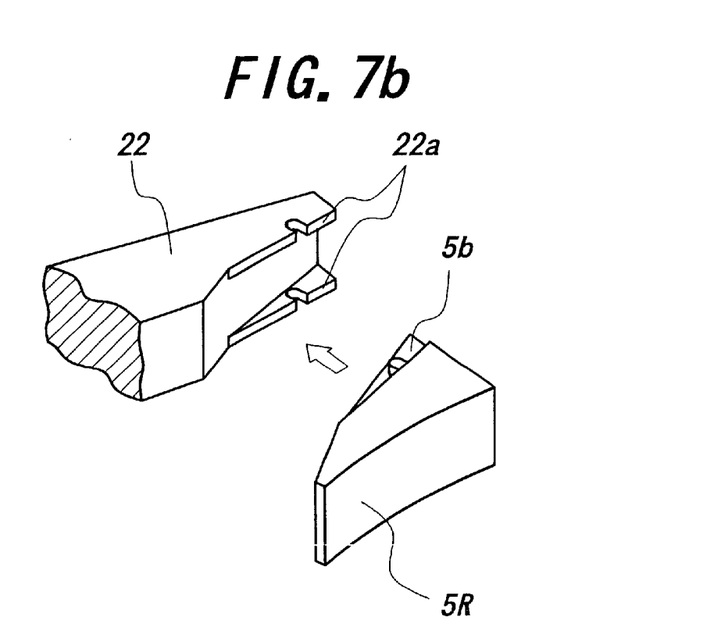

FIG. 7 shows seventh embodiment of the image display device according to the present invention. FIG. 7(a) is a diagrammatical plan view, and FIG. 7(b) is a partially exploded perspective view. In this embodiment, each of right and left observation optical system having right and left flat fluorescent tubes 12L, 12R, right and left LCDs 4L, 4R, right and left optical elements 5L, 5R is rotated to 180 degrees around the corresponding visual axis of the eyeball, and a see-through window 21 is formed to front central portion of the main body 1 of the device. In addition, when the external world is observed through optical elements 5L, 5R, and the see-through window 21, between window 21 for see-through window 21 and the optical elements 5L, 5R, the common distortion correcting prism 22 is provided for correcting the distortion of the external world image, thereby fitting the optical element 5L and 5R to distortion correcting prism 22 by positioning.

That is, in the present embodiment, optical elements 5L, 5R are arranged almost vertically outside of both eyes of the user 51, in such a manner that the display plane is directed inside respectively, these optical element 5L and 5R are white-illuminated from the back side by the corresponding flat fluorescent tubes 12L, 12R, the luminous flux concerning to the image is lead to the right and left eyeballs 52L, 52R through corresponding optical elements 5L, 5R, observation windows 6L, 6R, and The external world image is led to the right and left eyeballs 52L, 52R through the see-through window 21, the distortion correcting prism 22, the optical elements 5L, 5R, and the observation windows 6L, 6R.

In the optical element 5R, as shown in FIG. 7(b), a part of top and bottom of ridge line portion at front side is provided with a positioning recess and projection engagement portion 5b, respectively, and a distortion correcting prism 22 is provided with a positioning recess and projection engagement portion 22a engaged with the recess and projection engagement portion 5b of the optical element 5R, so that the optical element 5R is fitted to a distortion correcting positioning prism 22. The optical element 5L is also fitted to the distortion correcting prism 22 in the same way as the above by positioning.

According to the present embodiment, the external world is observed in a central portion of the main body 1, so that the external world can be observed even at the short distance.

Moreover, in this embodiment, flat fluorescent tubes 12L, 12R are used as right and left illumination means, but LED and the light leading member can be used as explained for example by the first and second embodiments. Moreover, the illumination means can be omitted by using the image displaying element of self emission type respectively instead of LCDs 4L, 4R.

Figure 8:
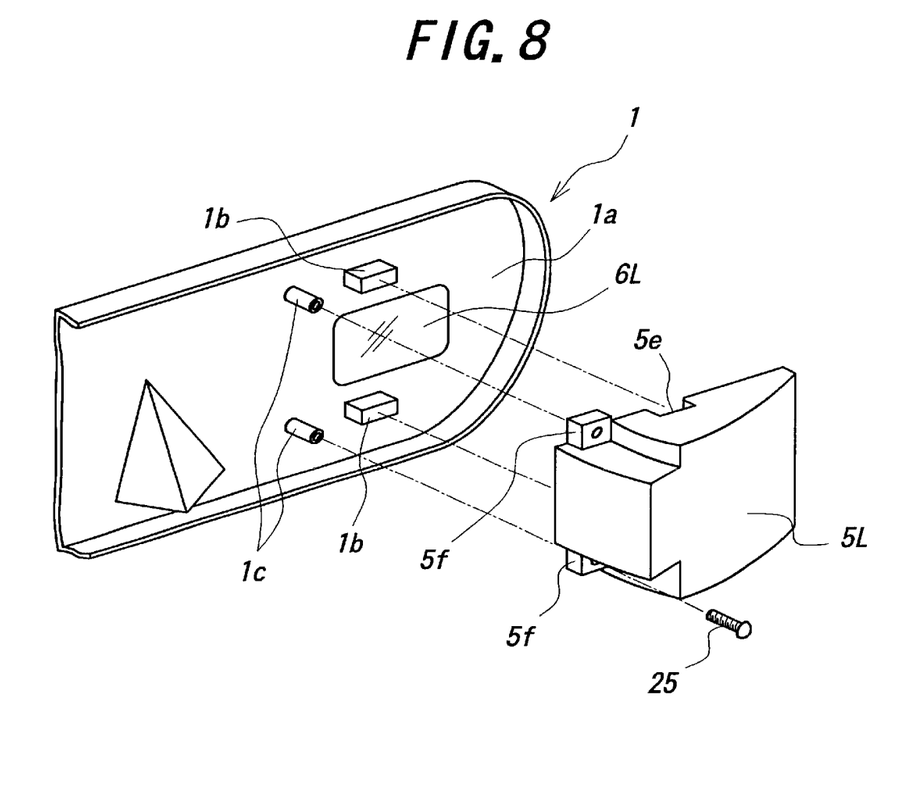
FIG. 8 is an exploded perspective view showing the constitution of principal portion of eighth embodiment of the image display device according to the present invention, diagrammatically.

FIG. 8 is a perspective view showing the constitution of the principal portion of eighth embodiment of the present invention. According to the present embodiment, in first-sixth embodiments, optical elements 5L, 5R are positioned and fixed to the casing 1a which forms outer shape of the main body, and is provided with observation windows 6L, 6R. Therefore, as shown in FIG. 8, the optical element 5L is provided with the positioning engagement recess portion 5e at a part of top and bottom of the ridge line portions at its emergent plane side, respectively, thereby forming the fixing portion 5f having the vis hole at a position apart from the engagement recess portion 5e. Moreover, the engagement projection portion 1b engaged to the engagement recess portion 5e of the optical element 5L is formed in the casing 1a, and a boss 1c for fixing the fixing portion 5f by a vis 25 is formed. Thus, the engagement recess portion 5e of the optical element 5L is engaged with the engagement projection portion 1b of the casing 1a, and in such a condition, the vis 25 is screwed with the boss 1c, thereby positioning and fixing the optical element 5L to the casing 1a. The optical element 5R is also fitted to the casing 1a in the same way as the above by positioning.

Thus, without using supporting member of another body rather than the casing 1a, by fixing optical elements 5L, 5R to the casing 1a, directly, with positioning, the main body 1 of the device can be made downsized, save weighted, and made inexpensive.

Figure 9:
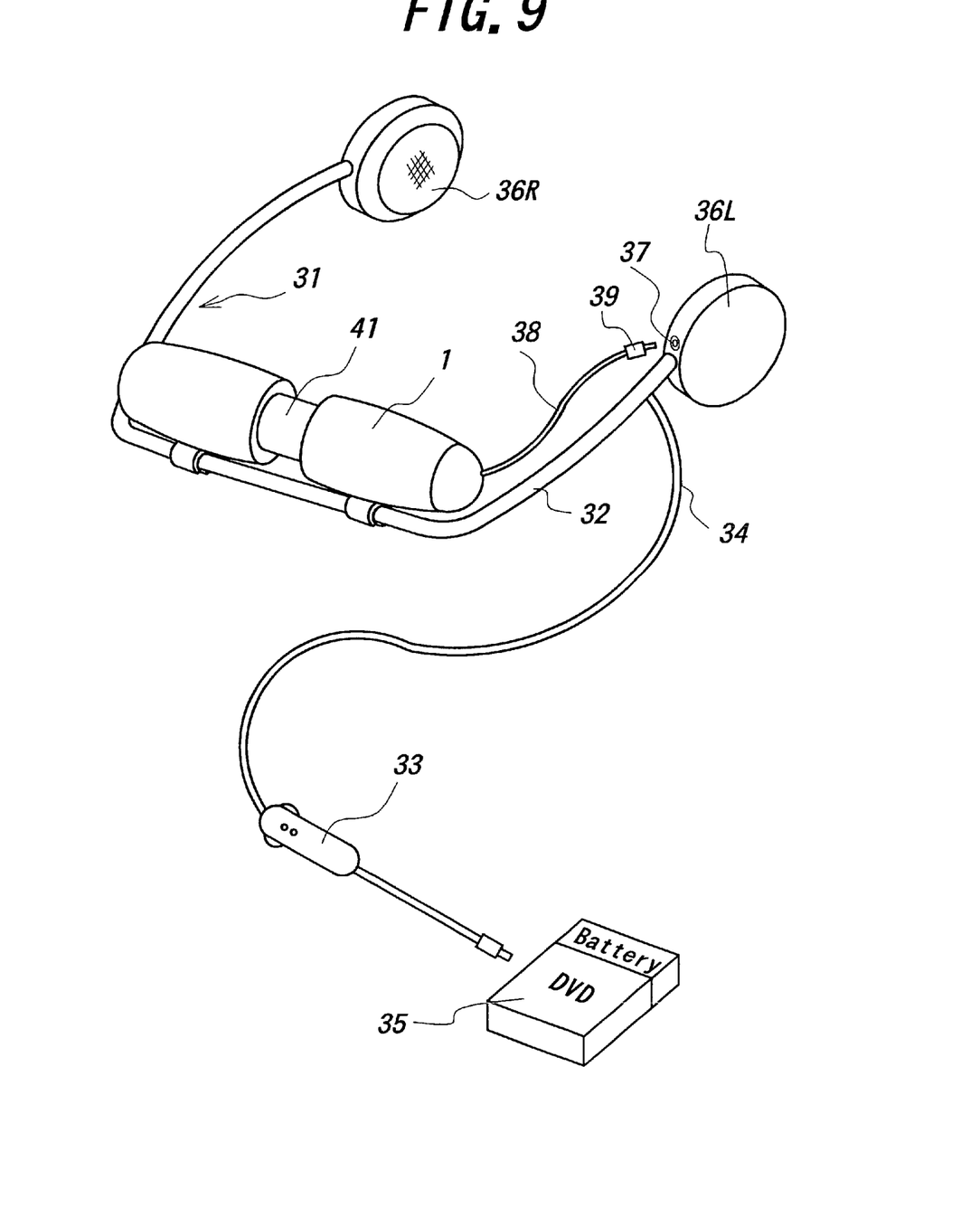
FIG. 9 is a perspective view showing the using mode of ninth embodiment of the image display device according to the present invention, diagrammatically.
Figure 10:
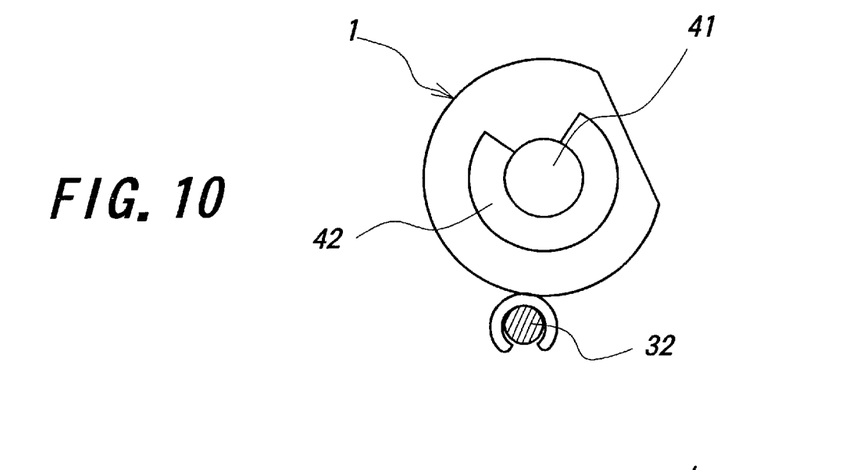
FIG. 10 is a partial cross-sectional view of FIG. 9.
Figure 11A:
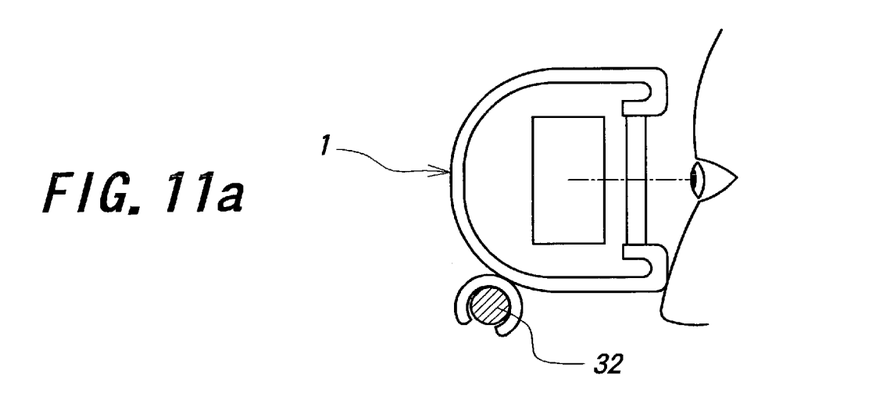
FIGS. 11a and 11b are side views explaining functions of the ninth embodiment of the image display device according to the present invention, diagrammatically. Suitable embodiment of the invention
Figure 11B:
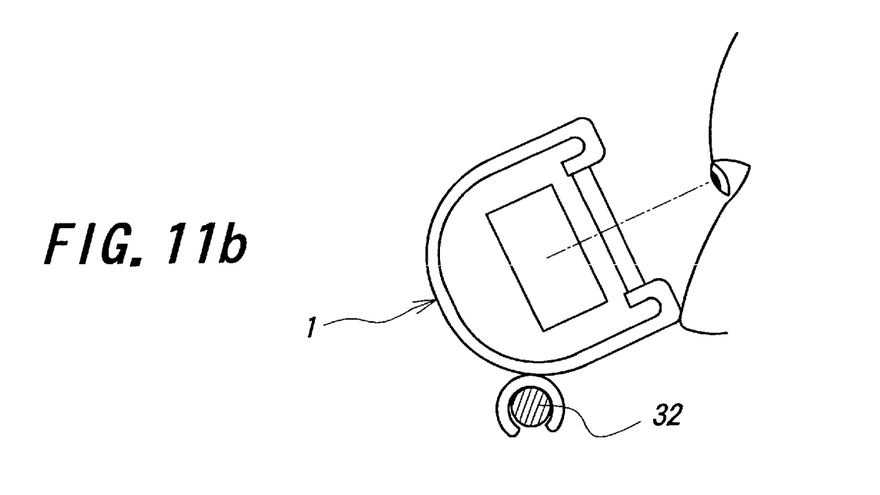

FIGS. 9 to 11 show ninth embodiment of the present invention: FIG. 9 is a perspective view showing the using mode of the main body 1 of the device, FIG. 10 is a partial cross-sectional view of FIG. 9, and FIGS. 11(a), and 11(b) are explanatory view explaining the function. As shown in FIG. 10, in this embodiment, the image display device 1 shown in the above respective embodiments is used detachably to a headphone 31. Main body 1 of the device is mounted detachably and rotatably for the headphone frame 32 in such a manner that the main body 1 is located on the upper part of the headphone frame 32, in the state of mounting the headphone 31, so as to locate the headphone frame 32 on the face side.

The headphone 31 is connected to a portable DVD player 35 comprising the image source, for example, the battery, through a code 34 with the plug having, for example, remote controller 33, thereby receiving the video signal, the audio signal, and the power supply, the audio signals are outputted from right and left headphone speakers 36L, 36R, and the video signals and the power supply are take out of Jack 37 which is installed in the one of headphone speakers, for instance, the housing of the headphone speaker 36L.

Moreover, the code 38 for the video signal and the power supply is extended from the main body 1 of the device, a plug 39 is provided at the tip portion thereof, and the video signal and the power supply are supplied to main body 1 of the device by connecting the plug 39 to the Jack 37 of the headphone 31.

The main body 1 of the device is provided with a nose receiving portion 41 with substantially circular cross-section at the central portion of the right and left of the body central portion, and a adjusting pad 42 is mounted detachably to the nose receiving portion 41 as shown in FIG. 10 by the cross-sectional view, so that the height position of the main body 1 of the device can be adjusted for the user's nose.

According to this embodiment, in the case of listening to only the voice of music etc., only the headphone 31 may be mounted, and in the case of observing the image, the plug 39 may be connected to Jack 37 by mounting main body 1 to the headphone 31, thereby becoming convenient. Moreover, the main body 1 of the device is located on the upper part of the headphone frame 32, thereby mounting the main body rotatably, so that as shown in FIGS. 11(a) and 11(b), the direction of line of sight can be arbitrarily adjusted and the external world can adjusted easily. In addition, the adjusting pad 42 is mounted to the nose receiving portion 41, and the height position of the main body 1 to the user's nose can be adjusted, so that the image can be observed regardless of the height of the user's nose with excellent fitting attitude.

Moreover, it is of course that the present invention is not limited only to the above embodiment, various modifications, deformations and applications can be possible within a range of departing gist of the invention. For example, a central portion was made see-through in the seventh embodiment, but the central portion does not make see-through, The circuit board can be arranged in the central portion. Moreover, in case of providing right and left LCDs, the illumination means is made unity and right and left LCDs are illuminated. In addition, in respective embodiments, in the case of using image display means of light receiving type, LCD of reflection type can be used in place of LCD of transmission type. Moreover, in respective embodiments of the present invention, hologram optical element (HOE) (FIG. 5) can be used for either optical elements 5L, 5R or illuminating light leading members 3L, 3R.

What is claimed is:

1. An image display device comprising:

right and left image display means arranged to direct a display plane to right and left outsides of a central portion of right and left eyes of a user in an observing image operation mode; and right and left optical elements which reflect luminous flux concerning right and left images from the right and left image display means in a horizontal plane to the user's right and left eyes;

wherein the right and left optical elements each comprise a prism, respectively; and wherein the image display device further comprises a positioning engage portion for a supporting member installed on a part of at least one ridge line portion of the prisms on a part of the side of the prisms where the luminous flux does not act on the image.

2. An image display device comprising:

right and left image display means which direct a display plane to right and left outsides of a central portion of right and left eyes of a user in an observing image operation mode; and right and left optical elements which reflect luminous flux concerning right and left images from the right and left image display means in a horizontal plane to the user's right and left eyes; wherein a main body of the image display device is detachably coupled to a headphone frame of a headphone; and wherein a nose receiving portion having a circular cross-section is provided to a central portion of the main body of the image display device.

3. An image display device as claimed in claim 2, wherein a video signal and a driving power are received from the headphone.

4. An image display device as claimed in claim 2, wherein the main body of the above image display device is located in the upper part of the headphone frame in the using state observing the image.

5. An image display device as claimed in claim 2, wherein the main body of the above image display device is made a rotatable for the headphone frame.

6. An image display device as claimed in claim 3, wherein the main body of the above image display device is made a rotatable for the headphone frame.

7. An image display device as claimed in claim 4, wherein the main body of the above image display device is made a rotatable for the headphone frame.

* * * * *